United States Patent

Williams et al.

[11] Patent Number: 6,144,669
[45] Date of Patent: Nov. 7, 2000

[54] PRIORITIZED PVC MANAGEMENT QUEUES FOR IMPROVED FRAME PROCESSING CAPABILITIES

[75] Inventors: Stephen J. Williams, Stittsville; Troy W. Manary, Nepean; William R. McEachern, Kanata, all of Canada

[73] Assignee: Newbridge Networks Corporation, Kanata, Canada

[21] Appl. No.: 08/989,689

[22] Filed: Dec. 12, 1997

[51] Int. Cl.[7] ...................................... H04L 12/66
[52] U.S. Cl. .................... 370/401; 370/410; 370/412; 370/465
[58] Field of Search ................. 370/229–231, 370/235–237, 248, 249, 351, 395, 396, 410, 412–419, 420, 400, 442–444, 465, 449, 384, 401; 340/825.06, 825.07, 825.08, 825.5, 825.51

[56] References Cited

U.S. PATENT DOCUMENTS

| | | | |
|---|---|---|---|
| 5,257,258 | 10/1993 | Birman et al. | 370/235 |
| 5,359,592 | 10/1994 | Corbalis et al. | 370/233 |
| 5,490,141 | 2/1996 | Lai et al. | 370/352 |
| 5,539,734 | 7/1996 | Burwell et al. | 370/410 |
| 5,570,360 | 10/1996 | Klausmeier et al. | 370/232 |
| 5,757,771 | 5/1998 | Li et al. | 370/235 |
| 5,802,042 | 9/1998 | Natarajan et al. | 370/255 |
| 5,835,484 | 11/1998 | Yamato et al. | 370/230 |
| 5,844,890 | 12/1998 | Delp et al. | 370/412 |
| 5,886,980 | 3/1999 | Zheng | 370/230 |
| 5,889,762 | 3/1999 | Pajuvirta et al. | 370/230 |

OTHER PUBLICATIONS

Silberschatz et al. "Operating System Concepts", pp. 137, 143–149, Feb. 1994.

Primary Examiner—Seema S. Rao
Attorney, Agent, or Firm—Blake Cassels & Graydon LLP

[57] ABSTRACT

There is provided a method and apparatus for the prioritization, multiple queuing and selective processing of PVC management frames by a Frame Relay message processing device. The device had an input port for receiving the messages. It also provides a number of message queues for storing and retrieving the received messages, each of the queues respectively corresponding to one of a number of response priority levels which vary from highest priority to lowest priority. Each of the response priority levels is assigned to a number of message classes associated with predetermined link management processes for communicating the status of message relay links among networking devices. The message processing device has a first processor for determining the message class associated with each of the received messages and for allocating each of the messages to a corresponding one of the queues based upon the response priority level assigned to the determined message class. A second processor is provided for retrieving each of the messages from the queues, and an output port is provided for dispatching the retrieved messages.

23 Claims, 9 Drawing Sheets

(c) PVC_STATUS IE

*PVC STATUS BIT CODINGS*

N: New. Set to 1 if PVC is new. Set to 0 if PVC is already present.

A: Active. Set to 1 if PVC is active. Set to 0 if PVC is inactive.

X: Reserved.

6,144,669

PRIORITIZED PVC MANAGEMENT QUEUES FOR IMPROVED FRAME PROCESSING CAPABILITIES

FIELD OF INVENTION

The present invention relates generally to virtual connection switching networks and to the processing of messages by networking devices, for instance in order to alleviate potential network instability caused by the implementation of network management protocols. More particularly, the invention relates to a method and apparatus for analyzing messages according to message classes associated with predetermined link management processes for communicating the status of message relay links between networking devices, wherein the message classes are associated with a response priority hierarchy and the messages are stored in a memory which permits messages of each of the classes to be separately retrieved.

The invention in its preferred embodiments relates to an apparatus and a method for the prioritization, multiple queuing and selective processing of virtual connection management frames, for instance permanent virtual circuit (PVC) management frames, by a Frame Relay message processing engine. Preferred embodiments of the invention are particularly suited to a networking device which performs Frame Relay to Asynchronous Transfer Mode (ATM) network interworking and which must be able to process PVC management frames both from the Frame Relay side and from the ATM side of the multiprotocol environment.

BACKGROUND OF THE INVENTION

Frame Relay service is available from public carriers worldwide, and the first networks utilizing the technology were established in 1991. Frame Relay is a well-known transmission technology that employs variable-length packet switching and provides an efficient method for transmitting bursts of data. The technology has seen widespread use and acceptance in such applications as LAN (Local Area Network) internetworking, SNA migration, image processing, remote access connections and Internet connectivity. For example, Frame Relay is often used to transmit data from one LAN (Local Area Network) to another LAN over a WAN (Wide Area Network) since the transmission between LANs tends to be in bursts. Frame Relay provides the networking advantages of high speeds, low delay, port sharing and dynamic bandwidth allocation.

In certain Frame Relay networks, network instability may result where a Frame Relay exchange apparatus does not possess the necessary capacity to process PVC management frames with sufficient dispatch to avoid that a given Frame Relay transmission stream be declared inactive. This is of particular concern where a network irregularity occurs in a Frame Relay network having thousands of connections, since incoming asynchronous status messages will be transmitted simultaneously by each affected device to the Frame Relay exchange apparatus. This may overburden the timely handling of PVC management frames by the apparatus, which will result in a false declaration of inactivity for the Frame Relay streams otherwise unaffected by the network irregularity.

Frame Relay and ATM networks each have distinct advantages and characteristics. It is therefore expected that the use of both technologies will continue to be prevalent for some time. Consequently, there is a need to provide for interoperability between ATM users and Frame Relay users. When network users are interworked through both ATM and Frame Relay networks, such multiprotocol environments may be particularly prone to the network instability problem mentioned above. This occurs when the available processing rate of an interworking device, such as a frame exchange apparatus, is exceeded by the requirement to concurrently process PVC management frames both from the Frame Relay side and the ATM side of the multiprotocol network interface.

It is therefore an object of preferred embodiments of the present invention to provide a method and apparatus for the prioritization, multiple queuing and selective processing of PVC management frames in order to alleviate the problem of potential network instability in Frame Relay networks and Frame Relay/ATM hybrid networks. This and other objects of the present invention will be made apparent in the detailed description of embodiments of the invention which follows.

SUMMARY OF THE INVENTION

According to a first broad aspect of the present invention, there is provided a method for processing messages in a networking device operative to communicate with another networking device in accordance with a communications protocol, said method comprising the steps of: (a) determining whether messages received by the device belong to any one of a plurality of message classes, the message classes being associated with predetermined link management processes for communicating the status of a message relay link between said devices, the message classes being further associated with a response priority hierarchy comprised of a plurality of response priority levels which varies from highest priority to lowest priority, and wherein each message class is respectively assigned one of said response priority levels of said hierarchy; and (b) storing the messages in a memory wherein messages of each said class may be separately retrieved from messages of the other said classes.

According to a second broad aspect of the present invention, there is provided an apparatus for processing messages received from networking devices operative to communicate with each other in accordance with a communications protocol, the apparatus comprising: (a) a first input port for receiving said messages; (b) a plurality of message queues for storing and retrieving said received messages, each of said queues respectively corresponding to one of a plurality of response priority levels which varies from highest priority to lowest priority, each of the response priority levels being assigned to a plurality of message classes associated with predetermined link management processes for communicating the status of message relay links among said networking devices; (c) a first processor for determining the message class associated with each of said received messages, and for allocating each of said messages to a corresponding one of said queues based upon the response priority level assigned to said determined message class; (d) a second processor for retrieving each of said messages from said queues; and (e) a first output port for dispatching said retrieved messages.

According to a third broad aspect of the present invention, there is provided an apparatus for processing messages in a networking device operative to communicate with another networking device in accordance with a communications protocol, the apparatus comprising: (a) means for determining whether messages received by the device belong to any one of a plurality of message classes, the message classes being associated with predetermined link management processes for communicating the status of a message relay link between said devices, the message classes being further associated with a response priority hierarchy comprised of a plurality of response priority levels which varies from highest priority to lowest priority, and wherein each message class is respectively assigned one of said response priority levels of said hierarchy; and (b) means for storing the messages in a memory wherein messages of each said class may be separately retrieved from messages of the other said classes.

According to a fourth broad aspect of the present invention, there is provided an apparatus for receiving, processing and replying to PVC management frames associated with a Frame Relay protocol environment and an ATM protocol environment, the apparatus comprising: (a) a first input port for receiving the PVC management frames from the Frame Relay protocol environment; (b) a second input port for receiving the PVC management frames from the ATM protocol environment; (c) first and second message queues for storing and retrieving PVC management frames received from the Frame Relay protocol environment and from the ATM protocol environment, the first and second message queues respectively corresponding to first and second response priority levels, the first priority level having highest priority and the second priority level having lowest priority, each of the response priority levels being respectively assigned to first and second message classes, said highest priority being assigned to the first message class and said lowest priority being assigned to the second message class, the first message class being associated with status enquiry frames and status frames received from the Frame Relay protocol environment, the second message class being associated with status enquiry frames and status frames received from the ATM protocol environment and with async/update frames received from the Frame Relay and ATM protocol environments; (d) a first processor for determining whether each received PVC management frame belongs to the first message class or the second message class, and for allocating each PVC management frame to the first queue if it belongs to the first message class and to the second queue if it belongs to the second message class; (e) a second processor for retrieving each PVC management frame from the queues in a concurrent round robin manner and for generating a reply thereto in the form of a response PVC management frame; (f) a first output port for dispatching said response PVC management frame to the Frame Relay protocol environment if the response PVC management frame is generated in reply to a received PVC management frame associated with the Frame Relay protocol environment; and (g) a second output port for dispatching said response PVC management frame to the ATM protocol environment if the response PVC management frame is generated in reply to a received PVC management frame associated with the ATM protocol environment.

BRIEF DESCRIPTION OF THE DRAWINGS

By way of illustration and not of limitation, preferred embodiments of the present invention will next be described with reference to the following drawings, in which.

DETAILED DESCRIPTION OF THE PREFERRED EMBODIMENT

The primary international standards which define Frame Relay messaging technology are set out in Table 1. These published standards are incorporated herein by reference.

TABLE 1

FRAME RELAY STANDARDS

| Topic | ANSI | CCITT (ITU) | Industry Defined Standards |
|---|---|---|---|
| Framework | — | I.122 | — |
| Service Description | T1.606 | I.233.1 | — |
| Data Transfer Protocol | T1.618 | Q.922 | — |
| Congestion Management | T1.606 | I.370 | — |
| Access Signalling | T1.617 | Q.933 | — |
| PVC Link Management | T1.617 (Annex "D") | Q.933 (Annex "A") | Original LMI |

Figures 1, 2, 4:
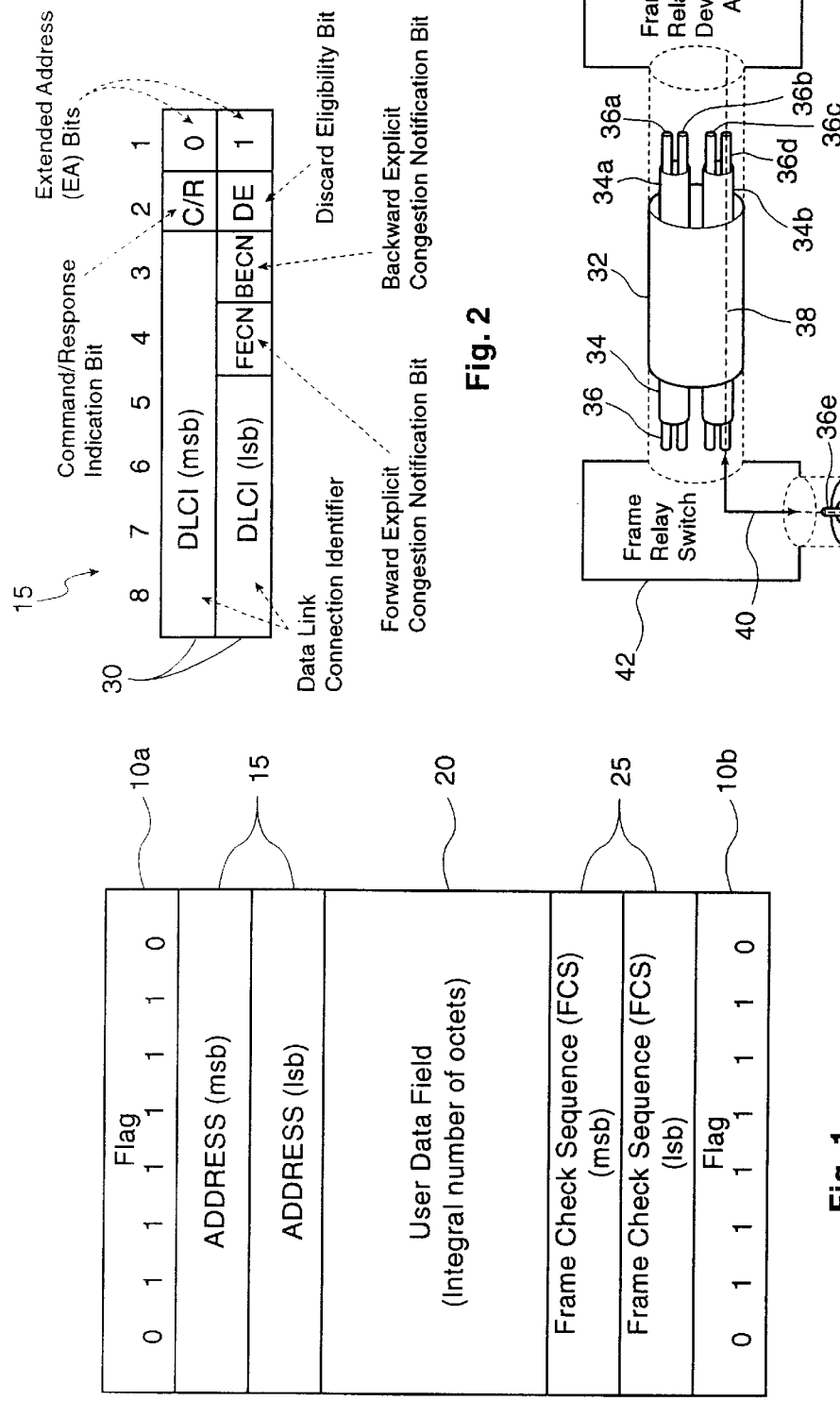
FIG. 1 is a representation of a standards defined format for a typical Frame Relay message frame.
FIG. 2 is a more detailed representation of an address field format within the message frame of FIG. 1.
FIG. 4 is a schematic representation of two Frame Relay network devices that are connected via a Frame Relay node, showing the logical and physical message paths associated therewith.

The known standards defined structure of a Frame Relay message frame is shown in FIG. 1. The frame consists of opening and closing flags 11a and 10b, a two-byte address field 15, a data field 20 of variable length, and a two-byte check sum field 25. As shown in FIG. 2, the address field 15 includes a Data Link Connection Identifier (DLCI) 30 which identifies the virtual connection between two directly connected Frame Relay devices.

The above mentioned frame relay standards provide various link management protocols for verifying the integrity of the physical link between the end user and the network, and for communicating the status of permanent virtual circuits (PVCs). The protocols define a link management interface (hereinafter "LMI") which operates over a standards defined dedicated virtual channel, identified by a reserved DLCI number. The full details of the link management protocols, which are quite similar, are defined in Frame Relay standards well known to those skilled in this art. The preferred embodiment of the invention is described with reference to the original LMI link management protocol defined in the document "Frame Relay Specification With Extensions", Document No. 001-208966, Sep. 18, 1990, by Digital Equipment Corporation, Northern Telecom, Inc. and StrataCom, Inc. (hereinafter "LMI Protocol"). Those e skilled in the art will recognize that the implementation of the invention which follows can be readily applied in relation to other Frame Relay link management protocols, such as Annex A of CCITT Q.933 or Annex D of ANSI T1.617, also well known to those skilled in this art.

Figure 3:
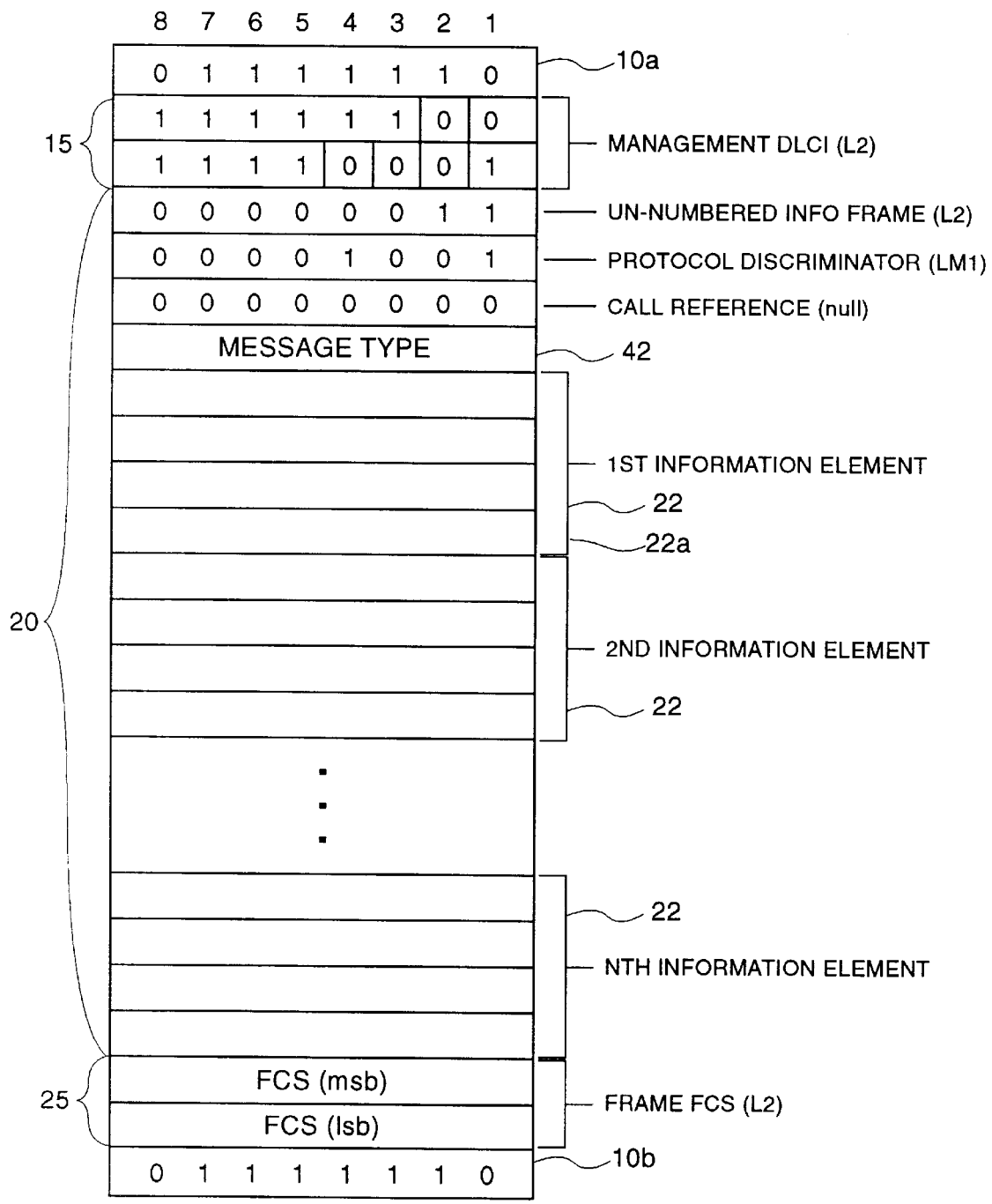
FIG. 3 is a representation of a link management frame structure according to known link management protocols.

The general structure of link management frames according to the LMI protocol (hereinafter "PVC management frames") is illustrated in FIG. 3. It will be noted that the user field 20 is used to carry one or more Information Elements ("IEs") 22. Procedurally, the LMI Protocol employs a polling mechanism or synchronous link management processes wherein one networking device periodically polls another networking device to inquire about the status of the PVCs over a particular "stream" between the two devices. The concept of streams is described in greater detail below. The polled networking device must then reply to the polling networking device. The reply assures the polling device that the link between it and the polled device is valid. If any such reply does not meet standards specified criteria, such as the reply message being received by the polling device within a predetermined configurable period of time, the polling device thus concludes that the frame stream and all of the PVCs routed over or carried by the stream are inoperative.

A stream, alternatively referred to in the art as "bearer channel" or "access port", is a type of virtual path between two directly connected Frame Relay devices and represents a pre-allocated portion of the bandwidth available over the physical interface between the two devices. FIG. 4 illustrates the logical relationships between a physical carrier 32, e.g. a T1 line, streams 34, DLCIs 36, and a PVC message path 38. In the example shown in FIG. 4, stream 34a carries DLCs 36a and 36b. Stream 34b carries DLCIs 36c and 36d. The PVC message path 38 represents the entire Frame Relay path from device A to device B, which path incorporates DLCI 36d, a cross-connect 40 of Frame Relay switch 42, and DLCI 36e.

The LMI Protocol defines two types of link management polling processes, which are carried out between networking devices which may be characterized as either "user devices" or "network devices" (these terms are relative as described in greater detail below). Both processes are driven by every user device on the network.

The first type of polling process, the so-called "heartbeat process", requests a keep-alive or heartbeat sequence number exchange with each network device. A sequence number is a number generated by an internal counter in each Frame Relay device. A user device sends its internal sequence number to a network device as well as the last network device's sequence number received from that network device. In reply, the network device sends the user device a status message comprising the internal sequence number of the network device and the last sequence number received from the user device. This polling procedure is repeated by the user device every $t_h$ seconds, $t_h$ being typically equal to a default value of 10 seconds. In this manner, the heartbeat process provides a means for monitoring the integrity of the communications link between the network device and the user device, as well as means for periodically re-synchronizing the two devices.

The other type of link management polling process, termed herein the "PVC status process", provides an exchange of PVC status information between the user and network devices. In this process, the user device polls the network device every $t_s$ seconds, $t_s$ being typically equal to a default value of 60 seconds, and requests a full status report of every PVC carried by a given stream. In reply, the network device sends a single PVC management frame to the user device, which frame comprises an IE for each PVC routed over the particular stream. The reply PVC management frame informs the user device as to each PVC the network device is aware of, whether or not that PVC is active and whether any new PVCs were recently configured on the network device. The user device can determine whether any PVCs have become inactive on the network device by comparing all of the PVCs reported in the presently received full status report against a previously received full status report. The PVC status process also incorporates the heartbeat process since sequence numbers, as described above, are exchanged between the network and user devices.

Figures 5, 6:
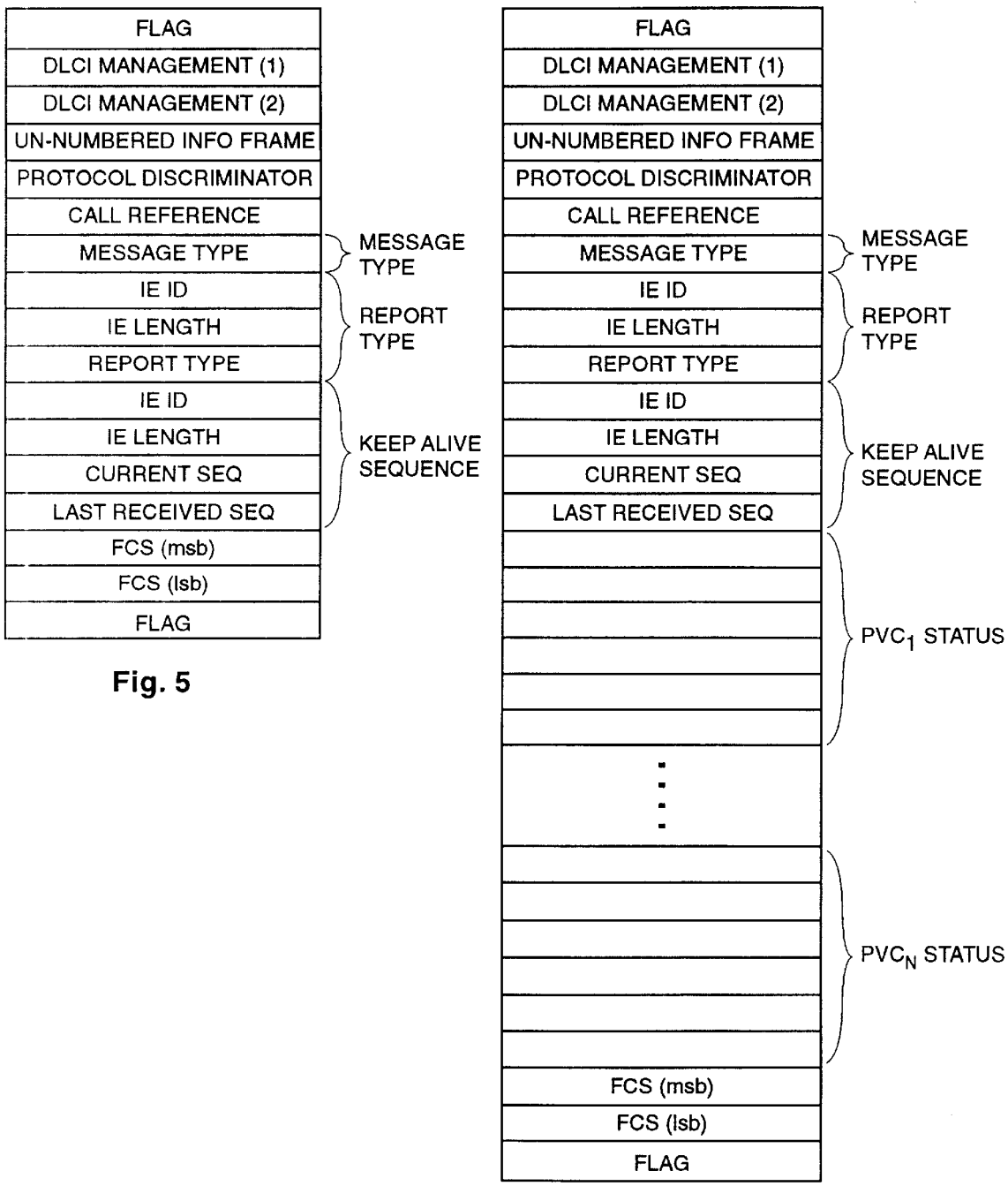
FIG. 5 is a representation of a status enquiry frame transmitted by a user device to a network device according to known link management protocols.
FIG. 6 is a representation of a status frame transmitted by a network device to a user device according to known link management protocols.

The format of the PVC management frames sent by the user and network devices in order to implement the heartbeat process and the PVC status process are illustrated in FIGS. 5 and 6. FIG. 5 shows the format of the PVC management frame which is sent by a user device to a network device (hereinafter "Status Enquiry Frame"). The field entitled MESSAGE_TYPE is used to indicate that the frame is a Status Enquiry Frame, namely that the direction of the message is from the user device to the network device. The KEEP_ALIVE_SEQUENCE IE field is used to pass values for the sequence number exchange, as described above. The REPORT_TYPE IE field specifies what kind of report is being requested from the network device. Two types of reports are defined: (a) a full status report (for the PVC status process) or, (b) only a keep-alive sequence number exchange (solely for maintaining the heartbeat process).

Figure 7:
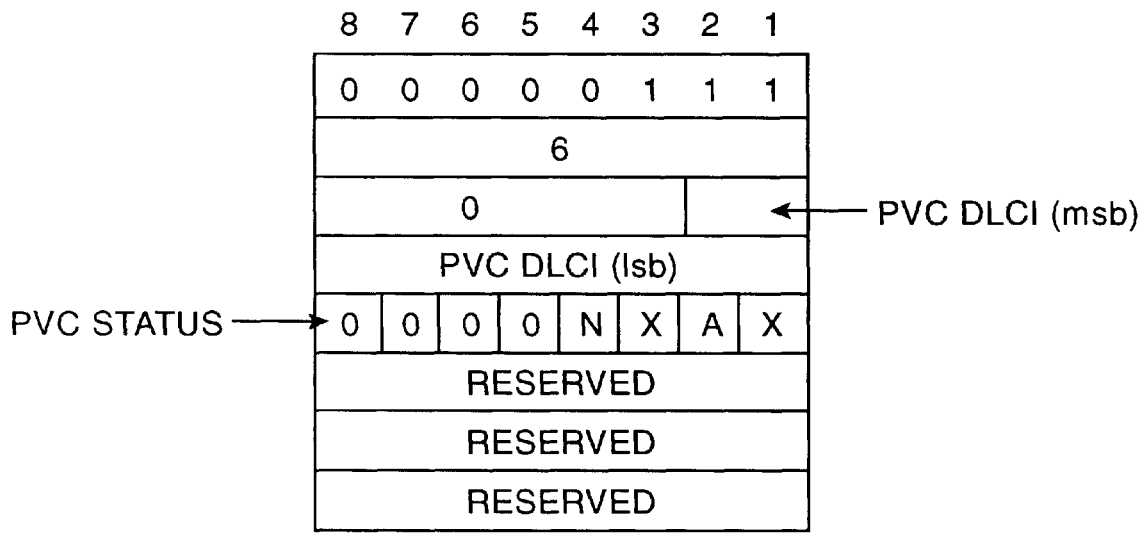
FIG. 7 is a detailed representation of PVC status IE fields found in the status enquiry frame and status frame of FIGS. 5 and 6, respectively.

FIG. 6 shows the format of the PVC management frame sent by a network device to a user device (hereinafter "Status Frame"). The Status Frame is similar to the Status Enquiry Frame but will include several PVC_STATUS IE fields when the REPORT_TYPE IE field indicates transmission of a full status report. The format of these PVC_STATUS IE fields is shown in FIG. 7. Further details concerning the various control bits within these frame fields can be found in the specification of the LMI Protocol, well known to those skilled in this art.

In addition to the foregoing polling processes, the LMI Protocol also includes a link management process wherein the network device asynchronously informs the user device by way of a PVC management frame over the LMI of any changes to the status of a PVC associated with the user device (hereinafter "update process"). The events that trigger the generation of the asynchronous PVC management frame depend in part on the particular Frame Relay standard being followed. In the LMI Protocol, the triggering events can include one or more of the following: (a) a change in PVC configuration, e.g. deletion of a PVC or a change in its allocated bandwidth; (b) a change in PVC status, e.g., from active to inactive; (c) a change in flow control due to the fact that on the network device an internal buffer associated with the PVC is nearing full capacity. It should be noted that unlike the PVC status process, the update process in practice generates a separate PVC management frame (hereinafter "Async/lupdate Frame") which is sent by the network device to the user device for each affected PVC, even though the PVC may be part of a group of PVCs carried over the same stream. In other words, IEs relating to multiple PVCs associated with a particular stream are not bundled together in a single PVC management frame as in the case of a Status Frame transmitted in association with the PVC status process, but instead are transmitted in separate PVC management frames. Also, it should be noted that the update process does not exchange sequence numbers between the network and user devices, i.e., the update process does not incorporate the heartbeat process.

Figure 8:
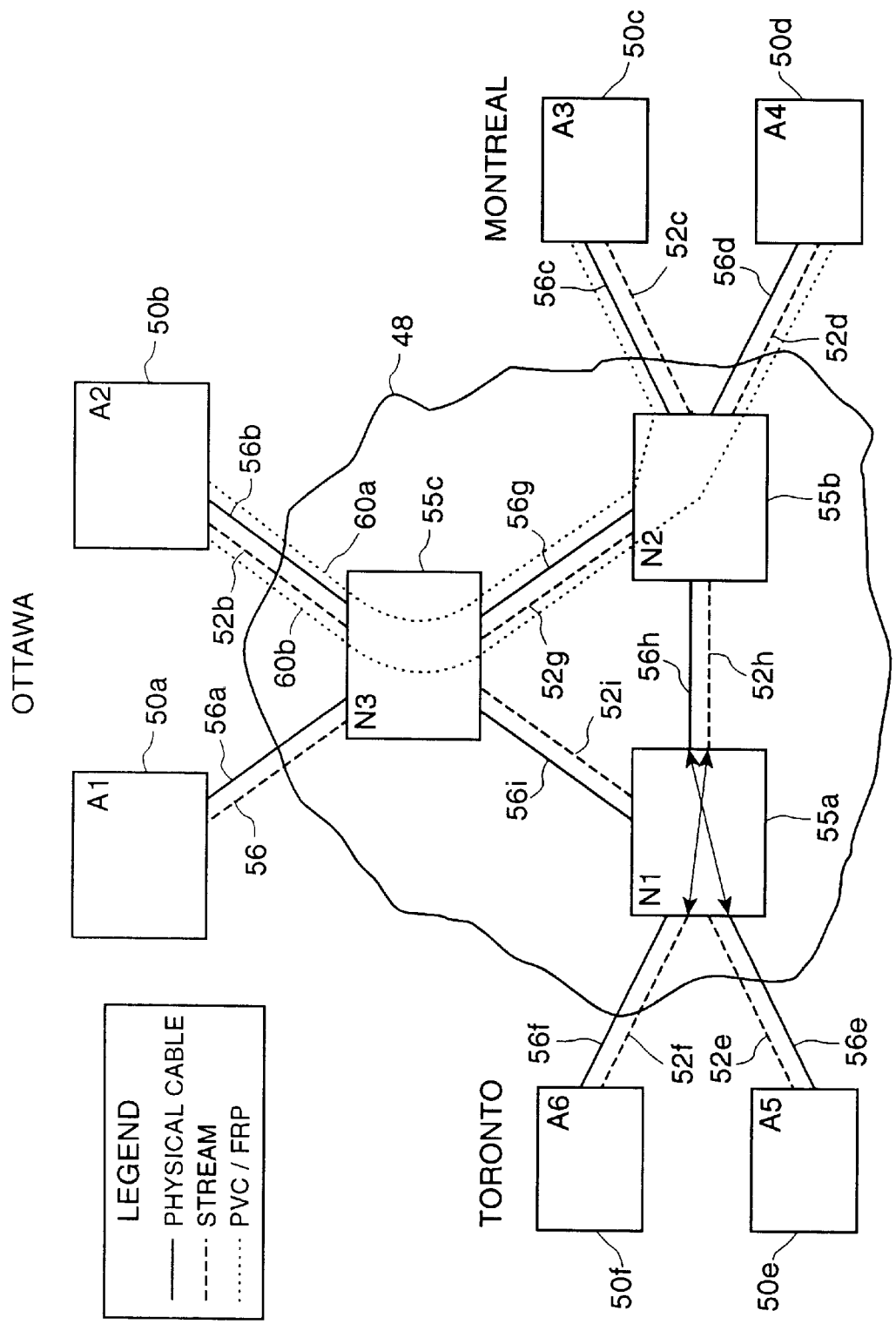
FIG. 8 is a schematic representation of a multi-user Frame Relay network which connects customer premise equipment located, by way of example, in three geographic areas.

The foregoing link management processes (i.e., heartbeat process, PVC status process and update process) have been said to be applicable between networking devices we have termed "user devices" and "network devices". Those skilled in this art will appreciate that these terms are relative, and depend upon where the particular networking device is located in a Frame Relay network. Referring for example to FIG. 8, customer premise equipment A3 (50c) performs link management processes as a user device ("hereinafter user procedures") in relation to a stream 52c. Frame Relay switch or node N2 (55b) performs link management processes as a network device (hereinafter "network procedures") in relation to stream 52c between N2 and A3. However, node N2 also performs link management processes as a user device with respect stream 52g connecting it to node N3 (55c) while simultaneously yet independently performing link management processes as a network device in response to the behaviour of node N3 as a user device (which dual user/network device behaviour is hereinafter termed "bidirectional procedures").

The foregoing arrangement allows the break of a link in a PVC to be communicated to the end user at customer premise equipment across the network. For example, if in FIG. 8 physical interface 56b were somehow severed, the heartbeat process associated with the link between A2 and N3 would detect the failure, declare PVCs 60a and 60b carried by stream 52b as inactive and, due to the update process, N3 would communicate two Async/Update Frames to node N2. In turn, the update process associated with node N2 will transmit one Async/Update Frame to customer premise equipment A3 (50c) to indicate the failure of PVC 60a, and one Async/Update Frame to customer premise equipment A4 (50d) to indicate the failure of PVC 60b. Similarly, customer premise equipment A5 (50e) and A6 (50f) would be notified that the PVCs linking them to A2 (50b) are unavailable for transmission purposes.

Figure 9B:
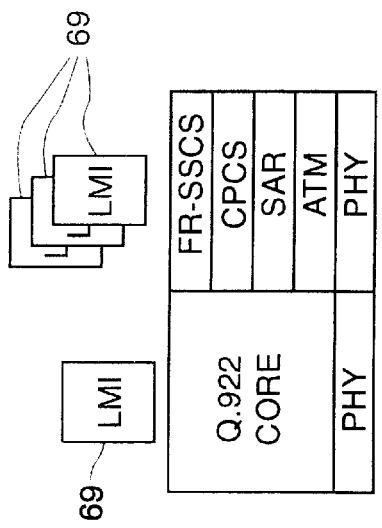
FIG. 9B is a simplified representation of a PVC status management interworking protocol stack, showing how Frame Relay status management messages are translated to ATM status management messages and vice versa.
Figure 9A:
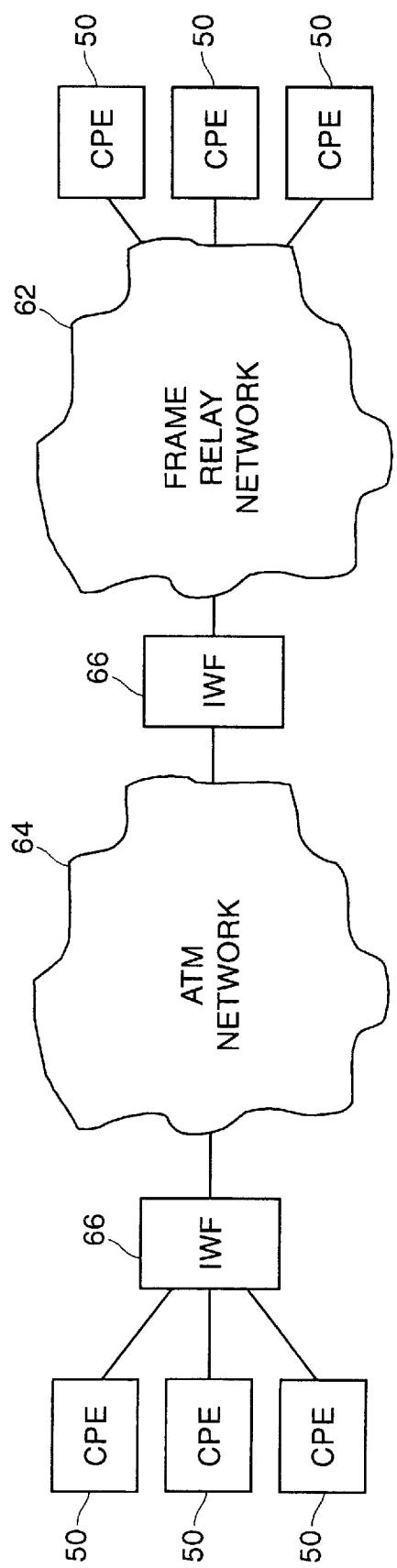
FIG. 9A is a schematic representation of a hybrid Frame Relay/ATM network showing customer premise equipment, a Frame Relay network, an ATM network and interworking devices therefor.

While reference has been made thus far to a Frame Relay network, it will be appreciated by those skilled in this art that frames can be carried over an ATM network. Interworking standards, such as the Frame Relay/ATM PVC Network Interworking Implementation Agreement, Dec. 20, 1994, Frame Relay Forum, Document No. FRF. 5, specific how variable-length Frame Relay packets can be converted into fixed-length ATM cells for transmission over an ATM network. FIG. 9A shows an example of a hybrid Frame Relay/ATM network (hereinafter "FR/ATM Network") comprising customer premise equipment ("CPE") 50, a frame relay network 62, an ATM network 64, and interfacing devices 66 effecting an interworking function ("IWT"). The ingress and egress points to the ATM network require hybrid or dual function Frame Relay/ATM interworking switches, such as the MainStreetXpress 36170, commercially available from Newbridge Networks Corporation of Kanata, Canada, in order to translate Frame Relay packets into ATM cells and vice versa.

The interworking standards referred to a above substantially permit the frame relay link management protocols such as the LMI Protocol to be implemented as previously described. One notable exception to this generality is shown in the schematic network interworking protocol stack diagram in FIG. 9B. Frame relay Status Frames (i.e., the full status report PVC management frames generated by the network procedures or bidirectional procedures described above) are segmented on a per connection basis for transmission over an ATM network. That is, Frame Relay Status Frames produced per stream by the network procedures or bidirectional procedures are translated into a plurality of individual ATM-style frames 69 for each PVC carried by the stream. Each PVC configured to perform FRF.5 performs link management processes between Frame Relay endpoints over the ATM network. Since each individual PVC may be routed anywhere through the ATM network in dependent of each other, the link management processes must be on a per PVC basis. For Frame Relay message frames arriving over the ATM network in a multiprotocol environment, the heartbeat process previously described is performed with $t_h$ being typically equal to a default value of 180 seconds. Likewise, the PVC status process previously described is also performed with $t_s$ being typically equal to a default value of 180 seconds.

Prior art Frame Relay switches typically queue all incoming frames in first-in first-out (FIFO) order for subsequent processing. This can cause significant problems when many PVCs are carried over the same stream or when there are many streams employed between two end user devices. Consider, for example, the situation described above with respect to FIG. 8. It would not be atypical for thousands of PVCs to be carried over physical interface 56b, particularly where A2 and A3 are LANs in different cities of the same customer organization. If physical interface 56b was severed, node N2 could receive thousands of Async/Update Frames in addition to the intermittent data frames and the other PVC management frames which N2 continues to receive from the remainder of nodes on the network.

Figure 10:
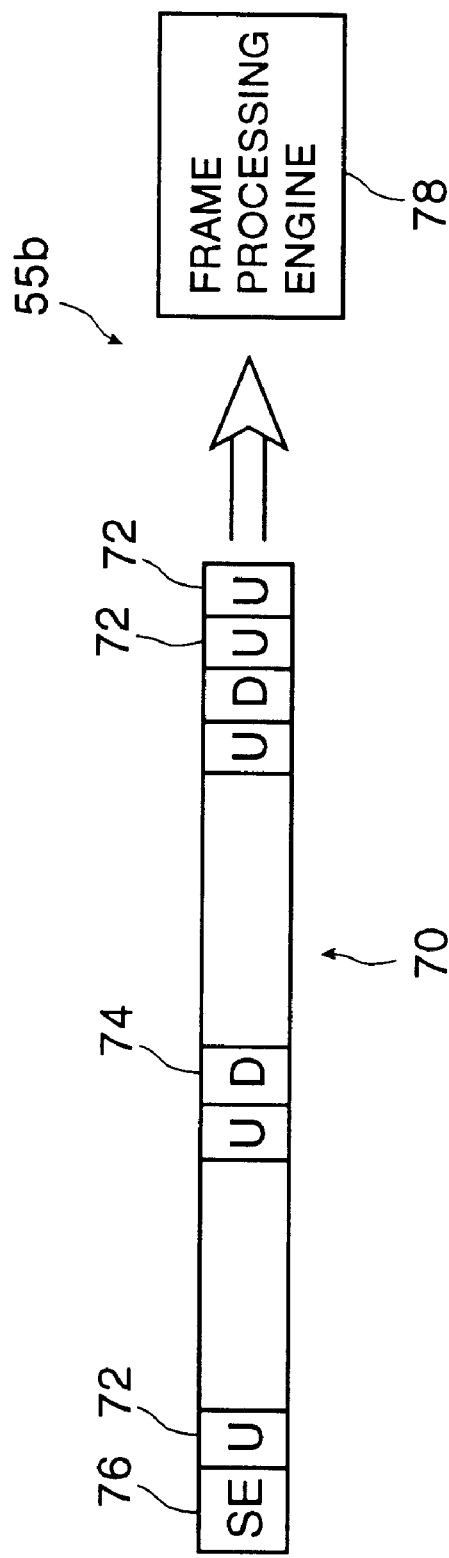
FIG. 10 is a block diagram of a network node within the network of FIG. 8, showing a frame processing engine and associated FIFO frame buffer according to the prior art.

Referring additionally to FIG. 10, node N2 comprises an incoming FIFO frame buffer 70 and a frame processing engine 78 which reads frames from the buffer 70 and processes them conventionally. As the speed of the frame processing engine is limited, the buffer 70 becomes very large, containing many Async/Update Frames 72 as well as data frames and other PVC management frames 74 received from the remainder of the network. In the meantime, the heartbeat and PVC status processes associated with nodes N1/N2 or nodes N3/N2 continue to mark time, and eventually a Status Enquiry Frame 76 is transmitted to N2 from either N1 or N3. The frame processing engine 78 associated with N2, however, may not be able to process the Status Enquiry Frame 76 in good time, and thus node N1 and/or N3 falsely register their respective links to node N2 inoperative. This, in turn, causes nodes N2 and N3 to transmit additional Async/Update Frames for each PVC routed therethrough, thereby causing further network instability. Similarly, CPE A3 and/or A4 may falsely conclude that their links to N2 are inoperative due to N2's congested incoming frame buffer.

This risk of network instability is further exacerbated in the case of hybrid FR/ATM Networks due to the fact that the Frame Relay Status Frames are broken up into a plurality of individual PVC management frames for each PVC carried by a stream, as described above. Thus, where network instability would have only likely been caused by an irregular event in a frame relay network, in an FR/ATM Network, network instability can be caused by the regular functioning of the PVC status process.

The invention according to its preferred embodiments provides an apparatus and a method for improving the processing capabilities of Frame Relay devices or hybrid FR/ATM devices to minimize the network instability problem mentioned above. The invention provides for certain predetermined PVC management frames to be given priority over other predetermined PVC management frames in order to reduce the likelihood of non-response to a Status Enquiry Frame, and thus the occurrence of a time-out in the heartbeat or PVC status processes. The priority is granted in relation to how quickly a device will time out if it does not receive a reply to a Status Enquiry Frame sent by the device, as explained in greater detail below.

Figure 11:
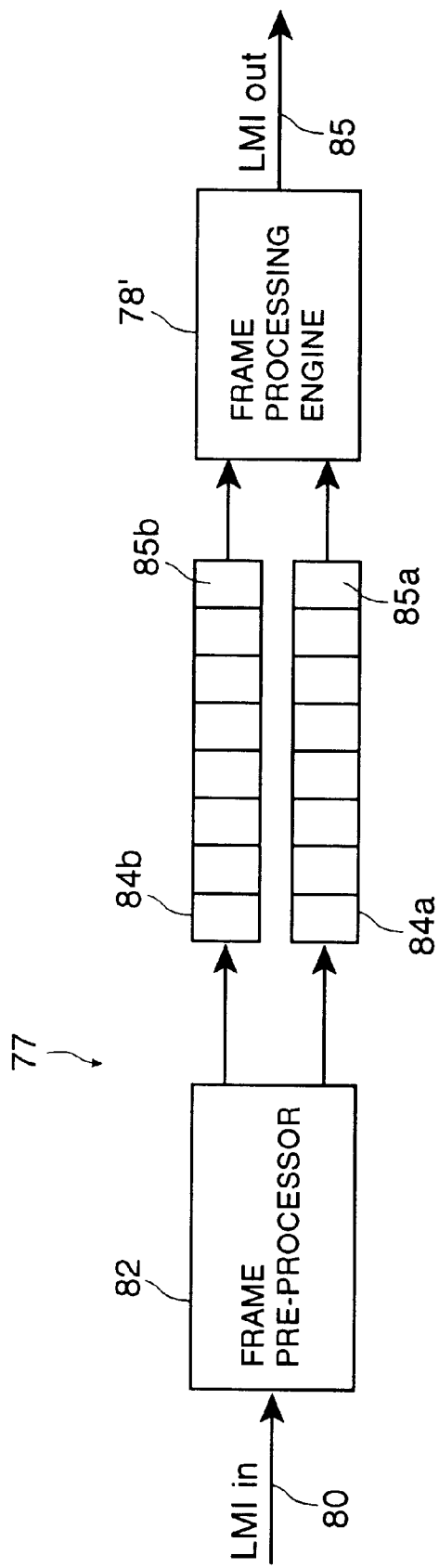
FIG. 11 is a block diagram of a Frame Relay processor according to a preferred embodiment of the present invention.

FIG. 11 shows one preferred embodiment of the invention in connection with an apparatus for processing messages in the form of a Frame Relay processor 77. As shown, a first processor such as a pre-processor 82 analyzes each incoming PVC management frame received from input port 80 to determine whether or not the frame is a high-priority or low-priority PVC management frame. Thus, each received message is analyzed to determine whether the message belongs to one of a plurality of message classes associated with predetermined link management processes. As well, each of these message classes is associated with a response priority hierarchy comprised of a plurality of response priority levels which varies from highest priority to lowest priority, with each message class being respectively assigned one of the response priority levels of the hierarchy.

Depending on the result as analyzed by pre-processor 82, the incoming frame will be placed on one of two preferably fixed-size preferably first-in first-out (FIFO) queues 84*a* and 84*b*. The purpose of these queues is to facilitate a preferred response priority hierarchy for processing the incoming frames, as set out in Table 2, and to permit frames pertaining to each priority level to be separately retrieved from frames pertaining to the other priority levels. Pre-processor 82 executes independently of any other process, and may be implemented either in software or as dedicated hardware.

TABLE 2

RESPONSE PRIORITY HIERARCHY FOR FRAME RELAY NETWORKS

| PVC Management Frame Type | | Priority Level |
|---|---|---|
| Status Enquiry | (First Message Class) | High |
| Status | (First Message Class) | High |
| Async/Update | (Second Message Class) | Low |

As seen in the prioritization scheme of Table 2, Status Enquiry Frames and Status Frames are part of a first message class that is granted a higher priority than Async/Update Frames which constitute a second message class. According to Table 2, Async/Update Frames are also allocated to queue 84*b*, which is predetermined to be a lower-priority queue. On the other hand, Status Enquiry Frames and Status Frames are placed in queue 84*a*, which is predetermined to be a higher-priority queue. It should be noted that the pre-processor 82 is not overly wasteful of computing resources since the pre-processor need only first test the DLCI field 15 (FIG. 3) and then, if necessary, the previously described MESSAGE_TYPE field and REPORT_TYPE field in order to allocate the incoming frame to the appropriate queue. The identification of frame types by examining various fields within a message frame is described more fully below in relation to another preferred embodiment of the invention.

A second processor of frame relay processor 77, such as a frame processing engine 78', functions substantially similar to the prior art frame processing engine 78 except in the provision of multiple queues 84*a*, 84*b* and in the manner and order by which incoming frames are retrieved. In this preferred embodiment, frames are preferably retrieved in a concurrent round-robin fashion. This means that, if available, the first frame 85*a* at the head of the high-priority queue 84*a* is retrieved and processed, then the first available frame 85*b* at the head of the low-priority queue 84*b* is retrieved and processed, then the next available frame 85*a* at the head of the high-priority queue is retrieved and processed, and so forth. In this manner, the problem of having potentially many Async/Update Frames congesting the flow of Status Enquiry Frames and Status Frames is substantially attenuated, and no queue or category of frame is starved for processing by the engine 78'. This enables the heartbeat process and PVC status process to smoothly continue to function in the presence of a severed link elsewhere in the Frame Relay network, such as described above with reference to FIG. 8.

After the frame processing engine 78' has processed the incoming PVC management frames in the order described above, the PVC management frames which it generates in response to the incoming frames (such as a reply Status Frame) are dispatched via output port 85. The dispatched frames may be forwarded to an output queue (not shown) for retrieval and further processing. Although concurrent round robin processing has been described above as the preferred handling method for queued frames, other methods of handling the queued frames may be employed, for instance exhaustive round robin processing. In exhaustive round robin processing, all frames in the highest priority queue are handled until the highest priority queue is empty, whereupon the next lower priority queue is accessed for frames.

Figure 12:
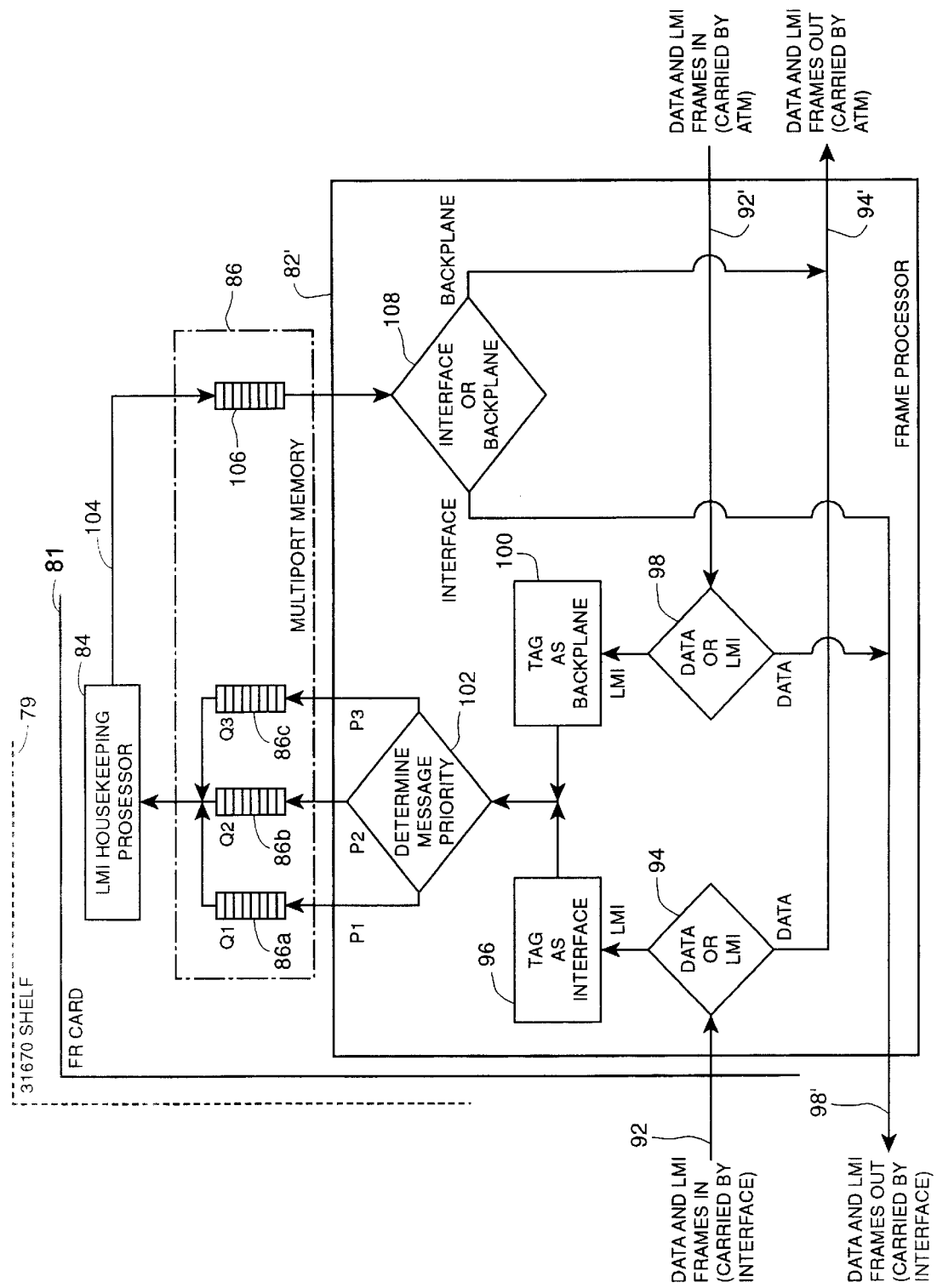
FIG. 12 is a block diagram of a Frame Relay card in a hybrid Frame Relay/ATM switch according to another preferred embodiment of the present invention.

With reference to FIG. 12, another preferred embodiment of the invention in connection with a Frame Relay processing apparatus in the form of a processing card 81 is next described. The Frame Relay processing card 81 may be one of the constituent elements of a Frame Relay/ATM interworking switch 79 such as the MainStreetXpress 36170, previously mentioned. The card 81 is housed in a "shelf" or series of plug-in slots that accept various cards which perform desired networking functions. The slots share a communications bus generally known to those in the art as a "backplane". The card 81 comprises first and second processors, namely a frame processor 82' which communicates with an LMI housekeeping processor 84, each of which has an independent thread of execution. In this preferred embodiment, each of the processors 82', 84 executes on a physically distinct microprocessor and communicates with each other via a multiport memory 86. In alternative embodiments, each processor could run as a software process or program having an independent thread of execution on a single physical microprocessor, in which case interprocess communication, as known in the art, would not require the multiport memory 86.

The frame processor 82' receives incoming data and PVC management frames over an interface, such as a first input port 92, in the case of data and PVC management frames received from the Frame Relay interface, and over a second input port or bus 92' in the case of data and PVC management frames received from the ATM backplane of the interworking switch 79. Two output ports 94', 98' for the frame processor 82' are provided, described in greater detail below. The frame processor 82' analyzes the incoming frames from the Frame Relay interface, as at 94, to determine whether or not the frame is a PVC management frame. If the frame is not a PVC management frame but is a data frame, the frame is dispatched out of the frame processor 82' to the ATM backplane via the second of two output ports, namely a bus 94'. On the other hand, if the incoming frame is a PVC management frame, the frame is tagged as an interface frame as at 96. Those skilled in the art will recognize that according to the FRF.5 standard, previously described, each of the Frame Relay data and PVC management frames that are to be dispatched to the ATM backplane are first segmented into ATM cells (not shown).

Likewise, for data and PVC management frames received from the ATM backplane by frame processor 82' over bus 92', the frame processor also analyzes these frames to determine whether or not they are PVC management frames as at 98. If so, the frame is tagged as a backplane frame as at 100. If the determination identifies a data frame, the frame is dispatched out of frame processor 82' to the Frame Relay interface via the first of two output ports, namely output port 98'. Those skilled in the art will recognize that according to the FRF.5 standard, previously described, each of the data and PVC management frames that are received from the ATM backplane are first reassembled from the ATM cells (not shown).

Once the incoming PVC management frames are tagged as either interface or backplane frames, a message priority for each frame is determined as at 102. Depending on a response priority level P1, P2 or P3 which has been preassigned to each message type received by the frame processor 82', the incoming PVC management frames will be placed on one of three preferably fixed-size preferably first-in first-out (FIFO) queues 86a, 86b, and 86c located in multiport memory 86. The purpose of these queues is to facilitate a preferred response priority hierarchy for processing incoming frames, as shown in either of the options set out in Table 3. In the case of Option 1 of Table 3, only two response priority levels are employed, whereas three such levels are employed in the case of Option 2. The priority hierarchy of Option 1 is next described, followed below by the scheme according to Option 2 of Table 3.

TABLE 3

RESPONSE PRIORITY HIERARCHY FOR FR/ATM NETWORKS

| PVC Management | Priority Level (Option 1) | | Priority Level (Option 2) | |
| --- | --- | --- | --- | --- |
| Frame Type | ATM | FR | ATM | FR |
| Status Enquiry | P2 Low (Message Class 2) | P1 High (Message Class 1) | P2 Medium (Message Class 2) | P1 High (Message Class 1) |

TABLE 3-continued

RESPONSE PRIORITY HIERARCHY FOR FR/ATM NETWORKS

| PVC Management | Priority Level (Option 1) | | Priority Level (Option 2) | |
| --- | --- | --- | --- | --- |
| Frame Type | ATM | FR | ATM | FR |
| Status | P2 Low (Message Class 2) | P1 High (Message Class 1) | P2 Medium (Message Class 2) | P1 High (Message Class 1) |
| Async/Update | P2 Low (Message Class 2) | P2 Low (Message Class 2) | P3 Low (Message Class 3) | P3 Low (Message Class 3) |

As revealed in the prioritization scheme of Option 1 in Table 3, a first message class consisting of Status Enquiry Frames and Status Frames coming from the Frame Relay portion of the interworking switch 79 are assigned a higher response priority level than any other type of frame, all such other frames constituting a second message class which comprises Status Enquiry Frames and Status Frames emanating from the ATM side of the processing card 81. The reason for this is due to the fact that Frame Relay message frames arriving over an ATM network in a multiprotocol environment are associated with frame management polling intervals typically set to longer default values, such as the 180-second defaults mentioned above for the heartbeat process and PVC status process. This is typically much longer than the polling intervals between devices in a pure Frame Relay network environment. Thus, devices located on the Frame Relay interface side of the processing card 81 are likely to time out more quickly than a corresponding device located across the ATM backplane. For this reason, the Status Enquiry Frames and Status Frames coming from the Frame Relay interface card 81 are granted the highest level of response priority.

The frame processor 82' thus places Status Enquiry Frames and Status Frames coming from the Frame Relay interface of the processing card 81 at the tail of one of the queues, for instance queue 86a, which is predetermined to be the high priority queue. The other types of PVC management frames are placed at the tail of one of the other queues, for instance queue 86b, which is predetermined to be the low priority queue. The LMI housekeeping processor 84 preferably retrieves frames from the queues for processing in a concurrent round robin fashion.

Once the incoming PVC management frames are processed by the LMI housekeeping processor 84, reply PVC management frames are dispatched via internal port 104 to an output queue 106 in the multiport memory 86. Frame processor 82' retrieves the PVC management frames from the queue 106 and first determines whether such frames are tagged as interface frames or backplane frames, as at 108. If the frame is an interface frame, it is dispatched outside of the frame processor 82' on the Frame Relay interface side via first output port 98'. If, on the other hand, it is determined that the retrieved frame is a backplane frame, such frames are dispatched to the ATM backplane via second output port or bus 94'.

An alternative priority scheme is shown in Table 3 under Option 2. In this scheme, a first message class consisting of the Status Enquiry Frames and the Status Frames coming from the ATM backplane of card 81 are assigned an intermediate response priority level, which is lower than the priority assigned to a second message class consisting of the same frames received from the Frame Relay interface of the card, but is higher than the priority assigned to a third message class consisting of any Async/Update frames. In such a response priority hierarchy, all three queues 86*a*, 86*b*, 86*c* of the multiport memory 86 are called into service, whereby queue 86*a* will be assigned to the high response priority frames, queue 86*b* will be assigned to the medium response priority frames and queue 86*c* will be assigned to the low response priority frames, by way of example. As previously explained, the LMI housekeeping processor 84 will retrieve frames from all three queues in a concurrent round robin fashion for processing.

It was discussed above that the message priority of incoming PVC management frames is determined, as at 102, by the processing card 81. As mentioned previously, the MESSAGE_TYPE field 42 of the link management frame is consulted in order to ascertain the type of frame being communicated. However, the MESSAGE_TYPE field provides different values for identifying each message type to which a response priority hierarchy may be associated, depending upon which link management protocol is being used. As a result of this, the DLCI field 15 must be verified. A DLCI value of 1023 will identify the frame as complying with the original LMI protocol described previously, whereas a value of 0 will identify the frame as complying with either of the Annex A or Annex D protocols referred to previously. For such Annex A or Annex D frames, the first IE field is also examined. If this IE field is recognized to be a shift IE field, the frame corresponds to the Annex D protocol. If this IE field is not a shift IE field, the associated frame corresponds to the Annex A protocol.

A MESSAGE_TYPE field with a value of hexadecimal 75 will always identify a Status Enquiry Frame in any of the three protocols. For Status Frames, these are identified by MESSAGE_TYPE values of hexadecimal 7D in original LMI. In Annex A or Annex D protocols, Status Frames are also identified by MESSAGE_TYPE values of hexadecimal 7D, and with REPORT_TYPE IE values (FIGS. 5 and 6) of 0 or 1. For Async/Update Frames, original LMI frames have MESSAGE_TYPE values of hexadecimal 7B. In Annex A or Annex D protocols, the MESSAGE_TYPE value is hexadecimal 7D, with a REPORT_TYPE IE value of 2.

Although the present invention has been described in relation to a dual function Frame Relay/ATM interworking switch, those skilled in this art will understand that the invention is applicable to any networking device which has a Frame Relay interface and which supports the LMI protocol, such as a switch, router or bridge. Moreover, those skilled in this art will perceive that the invention may be implemented either in conjunction with the Frame Relay function or with the ATM function of an interworking device. Lastly, those skilled in the art will readily understand that the invention is adaptable to any networking device which must prioritize the processing of messages based on differing response intervals or response priorities associated with such messages.

Generally, the present invention has been described with reference to preferred embodiments by way of example only, and those persons skilled in this art will appreciate that various modifications of detail may be made to the invention, all of which come within its spirit and scope.

What is claimed:

1. A method for processing link status messages in a networking device operative to communicate with another networking device in accordance with a communications protocol, the link status messages communicating the status of an associated message relay link between said networking devices, a first number of the link status messages each being associated with a predetermined response interval, wherein a failure to respond to a link status message within said predetermined response interval will result in the said associated message relay link being declared inoperative, said method comprising the steps of:

(a) determining whether link status messages received by the device belong to any one of a plurality of predetermined message classes, the message classes being associated with a response priority hierarchy comprised of a plurality of response priority levels which varies progressively from highest priority for a message class comprised of link status messages having relatively short predetermined response intervals to lowest priority for a message class comprised of link status messages having relatively long predetermined response intervals, and wherein each message class is respectively assigned one of said response priority levels of said hierarchy; and b) storing the link status messages in a memory wherein messages of each said class may be separately retrieved from messages of the other said classes.

2. The method according to claim 1, wherein a second number of link status messages are not associated with any predetermined response interval and wherein a further message class is provided that is comprised of said link status messages having no predetermined response interval, the message class being assigned a response priority level of the hierarchy which is of yet lower priority than the lowest priority for the message class comprised of link status messages having relatively long predetermined response intervals.

3. The method according to claim 2, further comprising the step of retrieving the link status messages stored in said queues in a concurrent round robin manner.

4. The method according to claim 3, wherein the link status messages are retrieved from the queues according to the priority hierarchy, wherein one link status message is retrieved in succession from each queue in the order of the queue associated with said highest priority to the queue associated with said lowest priority.

5. The method according to claim 4, wherein said communications protocol is a Frame Relay standard and said link status messages are PVC management frames.

6. The method according to claim 5, wherein the message classes comprised of link status messages having predetermined response intervals are associated with synchronous link management processes and the message classes comprised of link status messages having no predetermined response interval are associated with asynchronous link management processes.

7. The method according to claim 6, wherein said synchronous link management processes comprise a heartbeat process and a full status process, and wherein said asynchronous link management processes comprise an update process.

8. The method according to claim 2, further comprising the step of retrieving link status messages stored in said queues in an exhaustive round robin manner.

9. The method according to claim 8, wherein the link status messages are retrieved from the queues according to the priority hierarchy, wherein all link status messages are exhaustively retrieved from each queue in succession according to the order of the queue associated with said highest priority to the queue associated with said lowest priority.

10. An apparatus for processing link status messages received from networking devices operative to communicate with each other in accordance with a communications protocol, the link status messages communicating the status of an associated message relay link between said networking devices, a first number of the link status messages each being associated with a predetermined response interval, wherein a failure to respond to a link status message within said predetermined response interval will result in the said associated message relay link being declared inoperative, the apparatus comprising:

(a) a first input port for receiving said link status messages;

(b) two message queues for storing and retrieving said received link status messages, each of said queues respectively corresponding to one of two response priority levels representing a highest priority and a lowest priority, each of the response priority levels being assigned to one of two messages classes; the first message class being associated with link status messages having relatively short predetermined response intervals and the second message class being associated with link status messages having relatively long predetermined response intervals, and wherein said highest priority is assigned to said first message class and said lowest priority is assigned to said second message class;

(c) a first processor for determining the message class associated with each of said received link status messages, and for allocating each of said link status messages to a corresponding one of said queues based upon the response priority level assigned to said determined message class;

(d) a second processor for retrieving each of said link status messages from said queues; and (e) a first output port for dispatching said retrieved link status messages.

11. The apparatus according to claim 10, wherein a second number of link status messages are not associated with any response interval and comprise a third message class, and wherein a third message queue is provided for storing and retrieving said received link status messages of said third message class, the third message queue corresponding to a third response priority level which represents a yet lower priority than the lowest priority of said two response priority levels.

12. The apparatus according to claim 11, wherein said message queues are first-in first-out queues, each queue having a head and a tail thereof, said received link status messages being stored at the tail of said queues and being retrieved at the head of said queues.

13. The apparatus according to claim 12, wherein said second processor retrieves link status messages stored in the queues in a concurrent round robin manner.

14. The apparatus according to claim 13, wherein the link status messages are retrieved from the queues one link status message successively from each queue in the order of the queue corresponding to said highest priority to the queue corresponding to said lowest priority.

15. The apparatus according to claim 12, wherein said second processor retrieves link status messages stored in the queues in an exhaustive round robin manner.

16. The apparatus according to claim 15, wherein the link status messages are retrieved from the queues with all link status messages being exhaustively retrieved from each queue in succession according to the order of the queue corresponding to said highest priority to the queue corresponding to said lowest priority.

17. The apparatus according to claim 16, wherein said communications protocol is a Frame Relay standard and said link status messages are PVC management frames.

18. The apparatus according to claim 17, wherein the message classes comprised of link status messages having predetermined response intervals are associated with synchronous link management processes and the message classes comprised of link status messages having no response interval are associated with asynchronous link management processes.

19. The apparatus according to claim 18, wherein said synchronous link management processes comprise a heartbeat process and a full status process, and wherein said asynchronous link management processes comprise an update process.

20. The apparatus according to claim 19, further comprising a multiport memory for locating said queues, said memory being shared by each of said first and second processors.

21. The apparatus according to claim 20, wherein the apparatus is an interworking device which is operative to receive PVC management frames both from a Frame Relay environment and from an ATM environment, the apparatus further comprising a second input port for receiving said frames and a second output port for dispatching said frames, the first and second input ports being dedicated respectively to receive said frames from said Frame Relay environment and from said ATM environment, the first and second output ports being dedicated respectively to dispatch said frames to said Frame Relay environment and to said ATM environment, the first processor determining said message class for frames received from each of said input ports, the second processor respectively dispatching frames generated in reply to said received frames to said first output port if said received frames were received by the interworking device from said Frame Relay environment and to said second output port if said received frames were received by the interworking device from said ATM environment.

22. A method for processing link status messages in a networking device operative to communicate with another networking device in accordance with a communications protocol, the link status messages communicating the status of an associated message relay link between said networking devices, a first number of the link status messages each being associated with a predetermined response interval, wherein a failure to respond to a link status message within said predetermined response interval will result in the said associated message relay link being declared inoperative, a second number of the link status messages each not being associated with any predetermined response interval, said method comprising the steps of:

(a) determining whether link status messages received by the device belong to any one of at least two message classes, the message classes each being associated with a corresponding priority level within a priority hierarchy which varies from highest priority to lowest priority, wherein the link status messages which are not associated with any response priority interval are assigned to the message class associated with the priority level of lowest priority; and (b) storing the link status messages in a memory wherein link status messages of each said class may be separately retrieved from link status messages of the other said classes.

23. An apparatus for receiving, processing and replying to PVC management frames associated with a Frame Relay protocol environment and an ATM protocol environment, the apparatus comprising:

(a) a first input port for receiving the PVC management frames from the Frame Relay protocol environment;

(b) a second input port for receiving the PVC management frames from the ATM protocol environment;

(c) first and second message queues for storing and retrieving PVC management frames received from the Frame Relay protocol environment and the ATM protocol environment, the first and second message queues respectively corresponding to first and second response priority levels, the first priority level having highest priority and the second priority level having lowest priority, each of the response priority levels being respectively assigned to first and second message classes, said highest priority being assigned to the first message class and said lowest priority being assigned to the second message class, the first message class being associated with status enquiry frames and status frames received from the Frame Relay protocol environment, the second message class being associated with status enquiry frames and status frames received from the ATM protocol environment and with async/update frames received from the Frame Relay and ATM protocol environments;

(d) a first processor for determining whether each received PVC management frame belongs to the first message class or the second message class, and for allocating each PVC management frame to the first queue if it belongs to the first message class and to the second queue if it belongs to the second message class;

(e) a second processor for retrieving each PVC management frame from the queues in a concurrent round robin manner and for generating a reply thereto in the form of a response PVC management frame;

(f) a first output port for dispatching said response PVC management frame to the Frame Relay protocol environment if the response PVC management frame is generated in reply to a received PVC management frame associated with the Frame Relay protocol environment; and (g) a second output port for dispatching said response PVC management frame to the ATM protocol environment if the response PVC management frame is generated in reply to a received PVC management frame associated with the ATM protocol environment.

* * * * *